US009296265B2

(12) United States Patent
Kessler et al.

(10) Patent No.: US 9,296,265 B2
(45) Date of Patent: Mar. 29, 2016

(54) TIRE PRESSURE MONITORING DEVICE AND SYSTEM

(71) Applicant: Huf Hülsbeck & Fürst GmbH & Co. KG, Velbert (DE)

(72) Inventors: Ralf Kessler, Pfinztal (DE); Markus Wagner, Ludwigsburg (DE); Axel Dussinger, Bad Rappenau (DE); Benjamin Mueller, Karlsruhe (DE); Roland Hofmann, Pforzheim (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 14/565,368

(22) Filed: Dec. 9, 2014

(65) Prior Publication Data
US 2015/0202932 A1 Jul. 23, 2015

(30) Foreign Application Priority Data

Jan. 17, 2014 (DE) .......................... 10 2014 100 533
Sep. 3, 2014 (DE) .......................... 10 2014 112 652

(51) Int. Cl.
*B60C 23/04* (2006.01)

(52) U.S. Cl.
CPC ............. *B60C 23/04* (2013.01); *B60C 23/0471* (2013.01); *B60C 23/0479* (2013.01)

(58) Field of Classification Search
CPC  B60C 23/04; B60C 23/0471; B60C 23/0774; B60C 23/0479; B60C 23/0422; B60C 23/0433; B60C 23/00; B60C 23/0408
USPC ............... 340/442, 445, 447, 426.33; 73/146, 73/146.2, 146.3, 146.5; 116/34, 34 R
See application file for complete search history.

(56) References Cited

U.S. PATENT DOCUMENTS

| 7,518,495 | B2 | 4/2009 | Tang |
| 7,518,497 | B2 | 4/2009 | Jost |
| 8,659,412 | B2 * | 2/2014 | Deniau ............... B60C 23/0408 340/10.4 |
| 8,692,661 | B2 * | 4/2014 | Deniau ............... B60C 23/0408 116/34 R |
| 2002/0075145 | A1 | 6/2002 | Hardman et al. |

(Continued)

FOREIGN PATENT DOCUMENTS

| DE | 603 10 104 T2 | 6/2007 |
| DE | 10 2007 003 861 A1 | 7/2008 |
| DE | 20 2004 021 911 U1 | 10/2012 |
| DE | 10 2012 010 969 A1 | 6/2013 |
| DE | 20 2013 102 794 U1 | 11/2014 |
| EP | 1 549 515 B1 | 11/2006 |

(Continued)

*Primary Examiner* — Hung T Nguyen
(74) *Attorney, Agent, or Firm* — Hackler Daghighian & Martino

(57) ABSTRACT

A tire pressure monitoring device is equipped for attaching to a wheel of a vehicle provided with pneumatic tires. The device measures the tire air pressure present in the pneumatic tire or a change of the tire pressure. An electrical circuit controls the tire pressure monitoring device. A memory stores a program for the electrical circuit. A first transmitter operates in a first frequency range for transmitting data out of the tire pressure monitoring device to a first receiver located outside the tire pressure monitoring device. In the memory initially a basic version of the program is stored, out of which multiple different versions of the program for multiple vehicle types can be developed. Subsequently, a fitting full version for a selected vehicle type is created in that program parameters intended for the selected vehicle type are subsequently stored in the memory of the tire pressure monitoring device.

32 Claims, 1 Drawing Sheet

(56) References Cited

U.S. PATENT DOCUMENTS

2005/0104722 A1 5/2005 Tang et al.
2008/0018447 A1 1/2008 Ghabra et al.

FOREIGN PATENT DOCUMENTS

EP 2 423 008 A1 2/2012
GB 2497374 A 6/2013

* cited by examiner

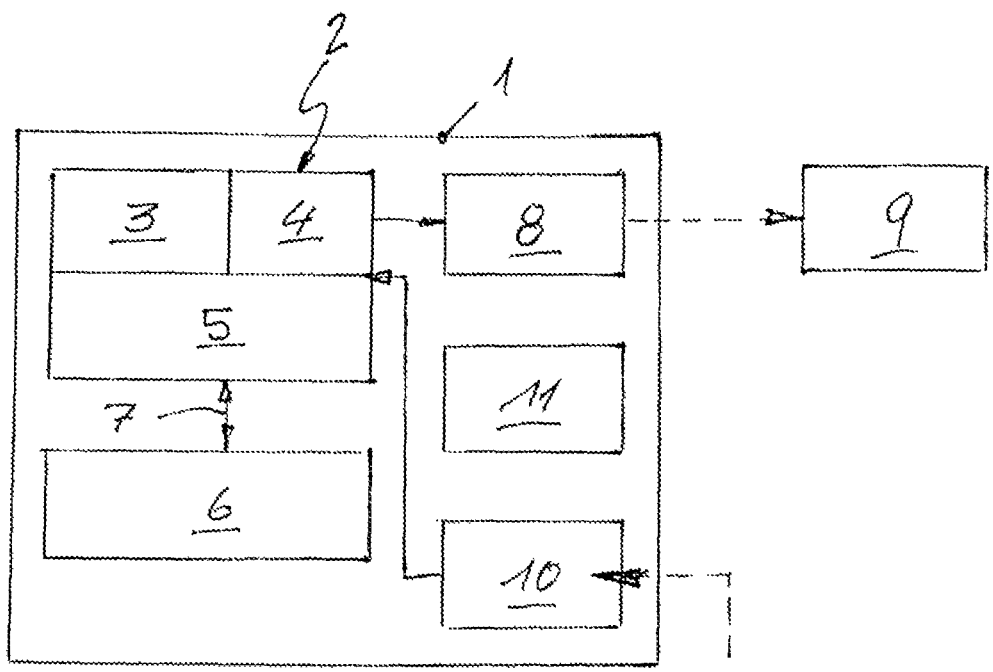
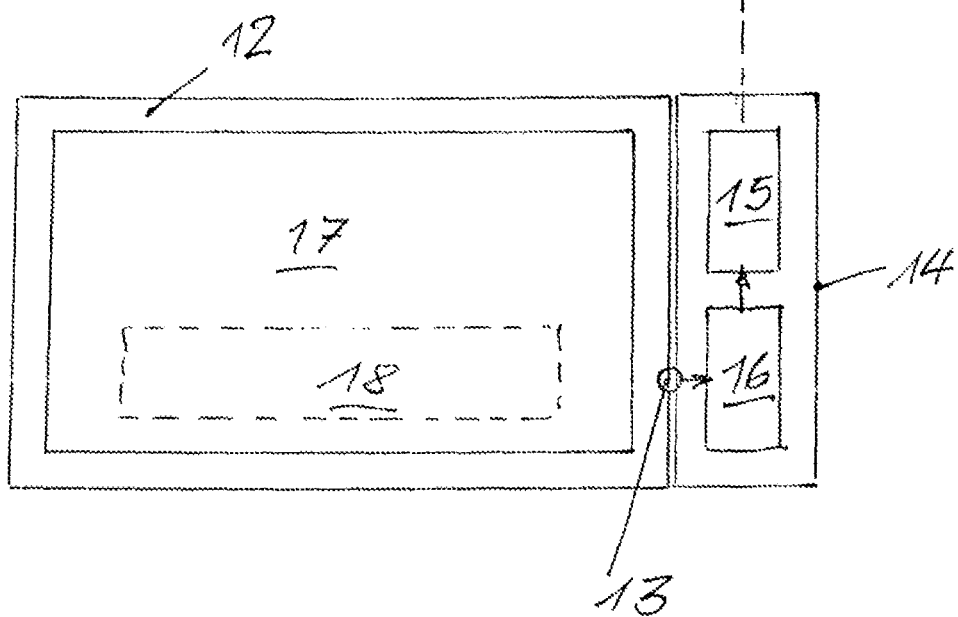

TIRE PRESSURE MONITORING DEVICE AND SYSTEM

CROSS-REFERENCE TO RELATED APPLICATIONS

This application claims priority to German Patent Application No. 10 2014 100 533.3, filed Jan. 17, 2014 and to German Patent Application No. 10 2014 112 652.1, filed on Sep. 3, 2014, the entire contents of which both applications are hereby incorporated by reference.

DESCRIPTION

1. Field of the Invention

The present invention generally relates to a method for adapting a tire pressure monitoring device, which is equipped for attaching to a wheel of a vehicle provided with pneumatic tires, to a vehicle type.

2. Background of the Invention

Such a tire pressure monitoring device can be attached in the interior of the pneumatic tire to the pneumatic tire itself, to the rim or to the valve. Outside the pneumatic tire, the tire pressure monitoring device can be attached to the valve. The tire pressure monitoring device, frequently also called wheel electronic unit, has a device for determining the air pressure present in the pneumatic tire, also called tire pressure, and/or for determining a change of the tire pressure. The tire pressure monitoring device can additionally comprise one or multiple devices for measuring state variables other than the tire pressure, in particular a temperature sensor for measuring the temperature of the tire pressure monitoring device and/or one or two acceleration sensors, with which the state of motion of the tire can be determined. An electrical circuit, which usually contains an ASIC, a microprocessor or a microcontroller serves for controlling the tire pressure monitoring device and for processing the measurement results obtained. A program for the circuit is stored in a digital memory which is assigned to the circuit or is part of the circuit.

The tire pressure monitoring device is equipped with a transmitter, which operates in a "first" frequency range. Known tire pressure monitoring devices have a transmitter that operates in the 315 MHz range or in the 433 MHz range. The transmitter transmits data from the tire pressure monitoring device to a receiver located outside the tire pressure monitoring device. A further receiver is provided in the tire pressure monitoring device itself; it is equipped for receiving data from a second transmitter located outside the tire pressure monitoring device, which operates in a "second" frequency range, which is distinct from the first frequency range. It is known to utilize such a second transmitter in order to trigger the tire pressure monitoring device in order for it to carry out a measurement operation and/or a transmitting operation.

The tire pressure monitoring device furthermore has a power source for its power supply. The power source can be a long-life battery. The power source however can also be for example a piezoelectric generator, which reacts to deformations, vibrations or accelerations of the pneumatic tire, generates a voltage by means of the piezo effect and charges an electric capacitor, from which the current for example for one measurement and transmitting operation can be repeatedly drawn. Such a piezoelectric generator is known for example form DE 603 10 204 T2.

It is known, furthermore, that vehicle manufacturers determine how a tire pressure monitoring device provided for a certain vehicle type has to operate. Accordingly, the tire pressure monitoring device determined for a selected vehicle type is adapted to this vehicle type in order to fulfill the specifications of the vehicle manufacturer. The specifications vary from vehicle manufacturer to vehicle manufacturer and within the vehicle models offered by a vehicle manufacturer in part also from model to model. For different vehicle types, numerous different tire pressure monitoring devices are therefore on the market and have to be available on the aftermarket and kept in stock by dealers or workshops.

On the aftermarket, universally utilizable, freely programmable tire pressure monitoring devices are already known. These have to be programmed in a motor vehicle workshop, in a tire workshop or by a replacement parts dealer with software that is specific for the respective vehicle type. This is very costly, since the software either has to be downloaded via the internet or loaded from a service CD and the tire pressure monitoring device completely reprogrammed with this software. The transmission of program codes and data, which make up the software, required for this purpose to the memory of the tire pressure monitoring device is usually performed wirelessly via an LF channel with a frequency of 125 kHz (LF means low frequency). For this purpose, known "universal" tire pressure monitoring devices, as they are described in U.S. Pat. No. 7,518,497 B2, contain a receiver for 125 kHz signals.

The motor vehicle workshop or tire workshop, wishing to install a universal tire pressure monitoring device on a vehicle, requires access to the internet or needs a computer with a programming station for this purpose, in order to transmit the tire software to the tire pressure monitoring device. The extent of the program codes and data to be transmitted typically amounts to several 10 kilobyte. Programming is not only time-consuming but also error prone.

SUMMARY OF THE INVENTION

The present invention is based on the object of facilitating and rendering more cost-effective the use of tire pressure monitoring devices.

This object is solved by a method having the features stated in the independent claims and by a tire pressure monitoring system having the features stated in the independent claims. Advantageous further developments of the invention are subject of the dependent claims.

According to the invention, a tire pressure monitoring device of the type mentioned at the outset is adapted to a certain vehicle type in that in the memory of the tire pressure monitoring device has initially stored a basic version of the program, out of which multiple different full versions of the program can be developed in order to equip the tire pressure monitoring devices with said program, which for different vehicle types have to fulfill different technical requirements, which are specified for example by the vehicle manufacturer. The tire pressure monitoring devices can be put on the market with this basic version of the program. Only thereafter, when it has been established for which vehicle type such a tire pressure monitoring device is to be used, are program parameters intended for this selected vehicle type stored in the memory of the tire pressure monitoring device and change the originally stored basic version of the program into a full version of the program adapted to the selected vehicle type.

This has substantial advantages:

The adaptation of the basic version of the program to the selected vehicle type, for which the tire pressure monitoring device is to be ultimately used, can be carried out much more easily and quickly than complete programming of the tire pressure monitoring device with a software that is specific for the selected vehicle type that is required up to now.

For adapting the basic version of the program to the selected vehicle type, the dealer on the aftermarket and the workshop, which is to carry out the adaptation, need not keep available complicated devices.

A hand-sized device, with which digital command signals can be transmitted to the tire pressure monitoring device wirelessly or in a wire-based manner is sufficient.

Since only few program parameters have to be transmitted, the command signal is quite short. Its length typically amounts to only between 10 Byte and 30 Byte.

Adapting the basic version of the program by loading program parameters, which are specific for the selected vehicle type, can be carried out quickly.

Adapting the basic version of the program by loading program parameters, which are specific for the selected vehicle type, is not susceptible to errors or faults.

The largest market for tire pressure monitoring devices exists in the U.S.A., since tire pressure monitoring systems are prescribed there by law for new vehicles. The method according to the invention has the advantage that with its help a tire pressure monitoring device with a basic version of the program that is alterable according to the invention can be used as replacement for roughly 80% of the tire pressure monitoring devices that are specific for the respective vehicle type existing on the American market.

The command signals, with which the program parameters for adapting the basic version of the program have to be loaded, can be transmitted with commercially available devices such as for example TECH400SD, which are already present on the market for the analysis of tire pressure monitoring systems and can transmit digital command signals with a frequency of 125 kHz.

The basic version of the program requires far less storage space than the storing of numerous complete versions of programs for the possible vehicle types described in U.S. Pat. No. 7,518,495 B2.

The program parameters are certain values to which variables of a program or a sub-program can be adjusted. With these program parameters, a program can be adapted and/or rendered more flexible and/or the architecture of a program or of a software can be modified.

The program parameters can be transmitted to the memory of the tire pressure monitoring device in a wire-based manner. This is possible even in the case of tire pressure monitoring devices the circuitry of which is embedded in a casting resin, because the casting resin can for example be pierced with electric contact needles, which strike the connection contacts located in or below the casting resin. In order to facilitate this, the locations of the surface of the casting resin that are to be pierced can be marked.

Preferentially, the program parameters are wirelessly transmitted to a receiver provided in the tire pressure monitoring device. The transmission is effected in particular by means of radio signals in a "second" frequency range to the "second" receiver in the tire pressure monitoring device. A hand-sized device with a transmitter, which is the "second" transmitter in terms of the dependent claims, which operates in the "second" frequency range, is sufficient for this. This second transmitter transmits the command signals to the second receiver provided in the selected tire pressure monitoring device, which co-operates with the memory provided there and with the circuit provided there, at least a part of the circuit operating digitally. Such devices, which can wirelessly transmit digital command signals to a tire pressure monitoring device, are known to the person skilled in the art. An example is the "TPMS Diagnostic and Programming TECH400SD" of the company Bartec USA LLC in 44213 Phoenix Drive, Sterling Heights, Mich. 48314, USA.

For this reason the second transmitter, which is to transmit the command signals with the program parameters, practically operates with a lower frequency than the first transmitter, in particular in the frequency range of 50 kHz to 300 kHz, preferentially at 125 kHz, since the range of these LF signals is shorter than the range of the signals which are transmitted with a frequency of 315 MHz or 433 MHz out of the tire pressure monitoring device to a receiver located outside and provided in the vehicle. The smaller range is no disadvantage since the only hand-sized device for transmitting the program parameters can be brought up close to the tire pressure monitoring device without problems. The lower range has the advantage that the program parameters are actually only effectively received and stored by the tire pressure monitoring device located next, while tire pressure monitoring devices located further distant are not interfered with.

Since during the production of tire pressure monitoring devices according to this patent it is not yet known for which vehicle types these are to be used in the future, the program parameters in the basic version of the program are preferentially merely stored with provisional numerical values. In principle, the provisionally stored numerical values can be selected arbitrarily. These do not have to make possible monitoring of the tire pressure for any vehicle type. Preferentially, however, such numerical values of the program parameters are provisionally stored in the tire pressure monitoring device ex-factory which enable monitoring of the tire pressure for at least one of the many possible vehicle types. Preferentially, a frequently used vehicle type is selected for this purpose. If there are multiple vehicle types, with which the tire pressure monitoring device can operate with the same program parameters, these program parameters can also be stored as provisional program parameters ex-factory.

At the aftermarket dealer or in a motor vehicle workshop or in a tire workshop, the provisional program parameter stored in the basic version of the program are changed in order to adapt the tire pressure monitoring device to a certain vehicle type. For this purpose, the provisionally stored program parameters are preferentially overwritten with the subsequently transmitted program parameters intended for the selected vehicle type. In this connection, the program parameters which are stored in the basic version of the program can be initially copied to other storage spaces and thereby saved before the subsequently transmitted program parameters intended for the selected vehicle type are stored. Saving the originally stored program parameters makes it possible to restore the tire pressure monitoring device to its original state as may be required.

As program parameters, which can vary from vehicle type to vehicle type and can therefore be created and subsequently changed in a tire pressure monitoring device according to the invention in a basic version of the program, in particular the following parameters are possible:

Warning thresholds for insufficient power supply. A sufficient power supply is indispensable for proper function of the tire pressure monitoring device. It is therefore important that in particular when the voltage and/or the state of charge of a battery provided in the tire pressure monitoring device fall below a predetermined limit value, or when the state of charge of a capacitor, which is to be recharged through a piezoelectric generator while driving, repeatedly falls below a lower limit value or when transmitting operations because of insufficient power supply are not carried out, not carried out at the intended time or not carried out completely, a message to the driver is important so that he can provide remedy and does not trust in the tire pressure monitoring device functioning free of error.

Program parameters, which determine the structure of a data telegram to be transmitted by the tire pressure monitoring device. Depending on vehicle manufacturer, such a data telegram has different contents, for example selected from the group of pressure, pressure difference, temperature, state of charge of the battery, state of motion of the wheel, an identifier, which individualizes the tire pressure monitoring device, the form of a preamble, which introduces the data telegram, and the sequence, in which the data to be transmitted is contained in the telegram. Accordingly, a motor vehicle manufacturer could prescribe that for example in the first place following the preamble a pressure signal, in the second place a pressure difference signal, in the third place a temperature value, in fourth place the identifier, in fifth place the state of charge of a battery and in sixth place information is positioned as to whether the wheel is at rest or rotates. All this can be determined by program parameters which are specific for the vehicle type concerned.

Program parameters which determine the transmission speed of the "first" transmitter, that is the transmitter which is located in the tire pressure monitoring device. Since the transmission speed, which is generally indicated in baud, of transmitter and receiver has to coincide and the receiver in the vehicle is predetermined, the transmission speed of the transmitter in the tire pressure monitoring device has to be adapted to the transmission speed for which the external receiver is designed. The adaptation can be determined by a corresponding program parameter.

Program parameters which determine the type of modulation of the transmitter in the tire pressure monitoring device. The type of modulation of the transmitter, frequency modulation or amplitude modulation, has to be matched to the receiver that is present in the vehicle, which is designed for a certain type of modulation, and can be determined by a program parameter.

Program parameters which determine time intervals between measurement operations and time intervals between transmitting operations. Such time intervals are normally predetermined by the vehicle manufacturer and have to be adapted under certain conditions to the mode of operation of the receiving device provided in the vehicle. The time intervals can be predetermined in a fixed manner, but they can also be determined dependent on the measured pressure, on a pressure drop or dependent on the speed of the vehicle. Accordingly it is known to increase the frequency of pressure measuring operations and of transmitting operations with increasing speed of the vehicle, wherein the transmitting operations do not necessarily take place exactly as frequently as the pressure measuring operations. It is known, furthermore, when a predetermined rate of tire pressure drop is exceeded, to increase the pressure measuring rate and the transmitting rate in order to obtain clarity as rapidly as possible as to whether in fact there is a critical pressure drop or only a measurement error. Similar can be provided when a predetermined rate of pressure increase is exceeded. The circumstances under which or when this should happen can be determined in the program through a program parameter.

A program parameter which determines the type of encoding of the data telegrams to be transmitted by the tire pressure monitoring device. Tire pressure monitoring devices usually use a Manchester encoding. Of this there are different types, of which the suitable type can be determined by transmitting a corresponding program parameter.

Program parameters which determine the states which the tire pressure monitoring device may assume, which transitions between these states are allowed and the conditions under which these take place. Such states can for example be the following:

A state of rest, in which the vehicle stands longer than a predetermined period of time. This period of time can be determined by a program parameter. It can also be predetermined if pressure measurements take place in the state of rest and if yes, at what time intervals, and if transmitting operations are to take place, and if yes, at what time intervals.

Another state is the normal state with moved vehicle. For this state, the rotational speed of the wheel, which can be measured by an acceleration sensor in the tire pressure monitoring device, at which the transition from the state of rest to the normal state of motion takes place, can be determined for example. In the state of motion there can be prescribed the time intervals at which pressure and temperature are normally measured, e.g. at time intervals of 3 seconds, and at what time intervals transmission operations are to take place, e.g. at time intervals of 60 seconds.

A third state can be the fast transmission mode. The tire pressure monitoring device is converted to this state when the tire pressure undershoots a lower threshold or when the rate of pressure drop exceeds an upper threshold. For the fast transmission mode it can be determined by program parameters how frequently measurement operations and transmission operations take place in this mode, e.g. both at time intervals of 1 second.

A program parameter, which determines the frequency at which the transmitter that is present in the tire pressure monitoring device is to transmit. The tire pressure monitoring device can be equipped for example to optionally transmit in the frequency range of 433 MHz, which is usual in Germany, or in the frequency range of 315 MHz, which is usual in the USA. The selection can be made by entering a corresponding program parameter.

Tire pressure monitoring devices regularly have an individual identifier, which they transmit as part of the data telegram to the receiver in the vehicle, so that the wheel of the vehicle from which the transmitted data telegram originates, can be determined there. In an advantageous further development of the invention, an identifier, which has already been stored in the basic version of the program of a tire pressure monitoring device, can be subsequently changed. This makes it possible in cases in which in a certain wheel position of a vehicle a tire pressure monitoring device is replaced with another tire pressure monitoring device, be it because the previous tire pressure monitoring device is defective or because for example a summer tire is swapped for a winter tire, to request the identifier of the previous tire pressure monitoring device and to transmit it into the new tire pressure monitoring device, which is to take the place of the old tire pressure monitoring device in the same wheel position. This has the advantage that the central receiving device in the vehicle in the case of such a replacement does not have to learn a new identifier but following the replacement of the tire pressure monitoring device is immediately fully functional again. Requesting and indicating the identifier of the tire pressure monitoring device to be replaced can for example be effected with the device TECH400SD.

For transmitting the program parameters, which are intended for a certain vehicle type, a wirelessly operating transmission device is preferentially used, which transmits digital command signals and operates with LF codes, which the digital circuit in the tire pressure monitoring device is able to interpret. A suitable transmission device is for example the already mentioned TECH400SD. On this transmission device for example a menu can be installed for the different possible vehicle types, preferentially a pull down menu, which contains the required program parameters for a number of vehicle types, preferentially in each case stored under the type designation of the vehicle concerned, so that by entering the type designation the associated program parameters can be accessed. The menu can either be pre-installed by the manufacturer of the transmission device or be downloaded onto the transmission device from the internet or be read into the transmission device from a CD-ROM or from another data carrier, which can also be supplied by the manufacturer of the transmission device or by the manufacturer of the tire pressure monitoring device according to the invention. The device TECH400SD for example has a slot into which a secure digital memory card (SD card) can be inserted in order to make possible software updates. In this way, such a pull down menu can also be loaded. In order to perform the transmission of the required program parameters merely the appropriate set of program parameters, which can be designated through the type indication of the vehicle, has then to be called up and the transfer to the memory of the tire pressure monitoring device started. Following this, the transmitted program parameters can be saved to prevent further changes, in particular through an arbitrarily triggered command signal.

Instead of a transmission device such as the TECH400SD, the program parameters can also be transmitted with a mobile telephone, in particular with a Smartphone if this is equipped with an interface, via which data can be transmitted with radio signals in the second frequency range.

A system out of such a transmission device with a menu for selecting a set of program parameters, which belong to a selected vehicle type, and with one or multiple tire pressure monitoring devices of the type mentioned at the outset, to which a selected set of program parameters is to be transmitted, is subject of the claims.

The tire pressure monitoring system consists of one or multiple tire pressure monitoring devices, which are equipped for attaching to a wheel of a vehicle provided with pneumatic tires and have a device for measuring the air pressure (tire pressure) present in the pneumatic tire or a change of the tire pressure, if appropriate additionally one or multiple devices for measuring measurement quantities other than the tire pressure, an electrical or electronic circuit, of which at least one part operates digitally, for controlling the tire pressure monitoring device and if appropriate for processing the measurement values supplied by the measurement devices, a memory, in which a program for the circuit is stored, an electrical power source for the power supply of the tire pressure monitoring device, a first transmitter operating in a first frequency range for transmitting data out of the tire pressure monitoring device to a first receiver located outside the tire pressure monitoring device, and of a digitally operating transmission device, in which among multiple addresses, which correspond to selectable vehicle types, a set each of program parameters is stored, which is intended following the selection of such a set, which is specific for a selected vehicle type, to be transmitted to the memory of the tire pressure monitoring device in order to, by inserting the selected program parameters into a basic version of a program already stored in the tire pressure monitoring device, convert the same into a full version of the program that is suitable for the selected vehicle type, with which the tire pressure monitoring device can monitor the tire pressure of a wheel on exactly this selected vehicle type.

The program parameters can be transmitted to the memory of the tire pressure monitoring device in a wire-based manner. In the case of tire pressure monitoring devices, the circuit of which is filled with a casting resin, the casting resin can be pierced with electrical contact needles at particularly marked locations of its surface for this purpose, which strike connection contacts that are located below the marked locations.

It is better to wirelessly transmit the program parameters to a second receiver located in the respective tire pressure monitoring device, which is equipped in order to receive data from a transmitter located outside the tire pressure monitoring device, which operates in a second frequency range. In this case, the transmission device comprises the second transmitter transmitting in the second frequency range.

The transmission device needs not be a specialized device such as for example the TECH400SD. It is an advantage of the present invention that the transmission device can also be a mobile telephone, in particular a Smartphone. Mobile telephones, which have an interface for outputting data, are already known. In the system according to the invention a mobile telephone is therefore advantageously employed, which has an interface for outputting data, which include the program parameters to be transmitted. In order to make it possible to transmit wirelessly, an assembly is provided that can be designed as a separate module and can be connected to the interface of the mobile telephone. Preferentially, the module can be connected to the mobile telephone in a fixed manner, e.g. plugged, so that the mobile telephone and the module can be handled like a unit. This assembly contains the transmitter operating in the second frequency range and a control device, which receives the program parameters output via the interface and controls the transmitter of the assembly so that the same transmits the program parameters to the second receiver in the tire pressure monitoring device. The transmitter provided in the assembly is matched with its transmission frequency to the frequency range, in which the second receiver provided in the tire pressure monitoring device can receive, in particular at 125 kHz.

In the tire pressure monitoring device, a memory together with the device for measuring the tire pressure is usually integrated in an integrated circuit, e.g. in an application-specific integrated circuit (ASIC), in a microcontroller or in a microprocessor. The integrated circuit can contain further sensors, e.g. an acceleration sensor and/or a temperature sensor. In addition to this, it can assume tasks for evaluating or pre-evaluating the obtained measurement values and for controlling the tire pressure monitoring device.

With the known tire pressure monitoring devices, the memory is not large enough in order to accommodate basic software satisfying all tire pressure monitoring systems that are present on the market. In an advantageous further development of the invention it is therefore provided to provide a separate additional memory in the tire pressure monitoring device outside the integrated circuit, in particular an EPROM or EEPROM. Between the integrated circuit with its memory on the one side and the additional memory on the other side, a line connection should exist via which communication between the integrated circuit and its memory on the one hand and the additional memory on the other hand is possible. The basic software can then be stored partly in the memory of the integrated circuit and partly in the additional memory. The additional memory can be dimensioned so that it can accommodate basic software which satisfies a larger number of tire pressure monitoring systems than would be possible with the memory that is available in the integrated circuit alone. The additional memory is preferably dimensioned so that it can accommodate basic software which satisfies all or almost all tire pressure monitoring systems present on the market.

Communication between the memory provided in the integrated circuit and the additional memory is preferentially effected in an encrypted manner. It can thereby be prevented that data can be intercepted via the line connection between the integrated circuit and the additional memory and previously unknown operating software of the tire pressure monitoring device can be analyzed.

A tire pressure monitoring device according to the invention, which is equipped for attachment to a wheel of a vehicle provided with pneumatic tires, and has a device for measuring the air pressure (tire pressure) present in the pneumatic tire or a change of the tire pressure, an electric or electronic circuit, of which at least one part operates digitally, for controlling the tire pressure monitoring device, a memory, in which a program for the circuit is stored, an electric power source for the power supply of the tire pressure monitoring device, and a first transmitter operating in a first frequency range for transmitting data out of the tire pressure monitoring device to a first receiver located outside the tire pressure monitoring device, according to the invention is preferentially characterized in that a first memory of the tire pressure monitoring device together with the device for measuring the tire pressure is integrated in an integrated circuit, in that in the tire pressure monitoring device additionally a separate additional memory is provided, wherein the first memory and the additional memory together form the memory of the tire pressure monitoring device, and in that between the first memory in the integrated circuit and the additional memory there is a line connection, via which communication between the first memory and the additional memory is possible. Therein, the additional memory is preferentially an EPROM or an EEPROM. Such a tire pressure monitoring device is particularly suited for use in a method according to the invention and in a tire pressure monitoring system according to the invention.

BRIEF DESCRIPTION OF THE DRAWINGS

The accompanying drawings illustrate the invention. In such drawings:

FIG. 1 schematically shows the construction of a tire pressure monitoring system according to the invention in a block diagram.

DETAILED DESCRIPTION OF THE PREFERRED EMBODIMENTS

The system comprises at least one tire pressure monitoring device 1 with an integrated circuit 2, in which among other things a pressure sensor 3 for measuring the tire pressure, a control and evaluation circuit 4 and a first memory 5 are formed. In addition to the integrated circuit 2 there is an additional memory 6, for example an EPROM or an EEPROM in the tire pressure monitoring device 1. The additional memory 6 has a line connection 7 to the integrated circuit 2. The data traffic between the integrated circuit 2 and the additional memory 6 takes place in an encrypted manner.

The integrated circuit 2 controls a first transmitter 8, which transmits for example at the frequency of 433 MHz provided for tire pressure monitoring systems. The transmitter transmits data, in particular the tire pressure or quantities derived from the same, an identifier and if appropriate further data made available to it by the integrated circuit 2 by radio to a receiver 9 provided outside the tire pressure monitoring device 1, which is located in a suitable location in a vehicle or on the underside of a vehicle, on which a wheel is mounted, which is equipped with the tire pressure monitoring device 1.

A second receiver 10 is provided in the tire pressure monitoring device 1; it is to receive at a frequency which is distinct from the frequency with which the first transmitter 8 transmits, in particular lower than the frequency of the transmitter 8. It is particularly preferred when the second receiver is matched to a frequency of 125 kHz.

A battery 11 supplies the components of the tire pressure monitoring device 1 with the electrical energy needed for its operation.

In the memories 5 and 6 of the tire pressure monitoring device 1 basic software is located ex-factory, which by transmitting few program parameters in an extent of not more than 20 to 30 Byte can be complemented into a full version of operating software for the tire pressure monitoring device 1 suitable for a certain vehicle type or changed by overwriting preset program parameters. In order to transit these few program parameters into the tire pressure monitoring device 1, for example a Smartphone 12 is provided which has a wire-based interface 13, via which digital data can be output. A module 14 can be docked onto this interface 13, which module 14 has a second transmitter 15 whose transmitting frequency is matched to the frequency of the second receiver 10 provided in the tire pressure monitoring device 1. Furthermore, a control circuit 16 is provided in the module 14, for example a microcontroller, which via the interface 13 receives data which it transmits into the tire pressure monitoring device 1 by means of the second transmitter 15 controlled by it. This data contains program parameters, which are selected with a keyboard 18, which is represented via software on the display 17 of the Smartphone 12, and can be accessed or input with the keyboard from a memory provided in the Smartphone 12 or in the module 14, e.g. in the microcontroller 16, in order to complement the basic software already stored in the tire pressure monitoring device 1 into a full version of the operating software for the tire pressure monitoring device 1 provided for the desired vehicle type.

The Smartphone 12 can be additionally utilized for pulling data from the tire pressure monitoring device 1, e.g. the current tire pressure.

Although several embodiments have been described in detail for purposes of illustration, various modifications may be made to each without departing from the scope and spirit of the invention. Accordingly, the invention is not to be limited, except as by the appended claims.

NUMERALS

1 Tire pressure monitoring device
2 Integrated circuit
3 Pressure sensor
4 Control and evaluation circuit
5 First memory
6 Additional memory
7 Line connection
8 First transmitter
9 First receiver
10 Second receiver
11 Battery, power source
12 Smartphone, mobile telephone
13 Wire-based interface
14 Module, assembly
15 Second transmitter 16 Control circuit
17 Display
18 Keyboard

What is claimed is:

1. A method for adapting a tire pressure monitoring device to a vehicle type, wherein the tire pressure monitoring device is equipped to attach to a wheel of a vehicle provided with pneumatic tires, the method comprising:
providing the tire pressure monitoring device for measuring a tire pressure present in the pneumatic tire or measuring a change of the tire pressure, wherein the tire pressure monitoring device comprises:
an electrical circuit, of which at least a part operates digitally, for controlling the tire pressure monitoring device;
a memory in which a program for the electrical circuit is stored;
an electric power source for power supply of the tire pressure monitoring device; and
a first transmitter operating in a first frequency range configured to transmit data out of the tire pressure monitoring device to a first receiver located outside the tire pressure monitoring device;
initially storing a basic version of the program in the memory, where multiple different versions of the program can be developed for multiple vehicle types from the basic version; and
subsequently creating an appropriate full version for a selected vehicle type where selected vehicle type program parameters are stored in the memory of the tire pressure monitoring device.

2. The method according to claim 1, wherein the tire pressure monitoring device has an input via which the selected vehicle type program parameters can be transmitted to the memory in a wire-based manner.

3. The method according to claim 1, wherein a second receiver is provided in the tire pressure monitoring device equipped to receive data from a second transmitter which is located outside the tire pressure monitoring device and operates in a second frequency range, where the selected vehicle type program parameters are transmitted to the second receiver by means of radio signals in the second frequency range.

4. The method according to claim 3, wherein the second transmitter operates at a frequency that is lower than that of the first transmitter.

5. The method according to claim 4, wherein the second transmitter operates at a frequency in the range from 50 kHz to 300 kHz.

6. The method according to claim 3, wherein the selected vehicle type program parameters are transmitted to the memory of the tire pressure monitoring device with a mobile telephone or Smartphone which is equipped with an interface connected to the second transmitter, wherein radio signals can be transmitted in the second frequency range from the second transmitter via the interface to the memory.

7. The method according to claim 3, wherein in the basic version of the program provisional program parameters are stored with provisional numerical values.

8. The method according to claim 7, wherein the provisional numerical values of the provisional program parameters are so selected that they make possible monitoring the tire pressure for at least one vehicle type.

9. The method according to claim 7, wherein the provisional program parameters stored in the basic version of the program are overwritten in the memory with the subsequently transmitted selected vehicle type program parameters intended for the selected vehicle type.

10. The method according to claim 9, including the step of copying onto other memory locations the provisional program parameters stored in the basic version of the program and saving the provisional program parameters before the subsequently transmitted selected vehicle type program parameters intended for the selected vehicle type are stored.

11. The method according to claim 1, wherein at least one program parameter included in the following group of program parameters are stored in the memory of the tire pressure monitoring device during the step of initially storing a basic version of the program in the memory, wherein the at least one program parameter is selected from the group consisting of warning thresholds for insufficient power supply, program parameters determining the structure of a data telegram to be transmitted by the tire pressure control device, program parameters which determine the transmission speed of the first transmitter, program parameters which determine the type of modulation of the first transmitter, program parameters which determine time intervals between measurement operations and time intervals between transmitting operations pressure-dependently and/or speed-dependently, program parameters which determine the type of the encoding of a data telegram to be transmitted by the tire pressure monitoring device, program parameters which determine the states which the tire pressure monitoring device can assume and which transitions between these states are allowed and under which condition such transitions take place, and a program parameter which determines the frequency at which the first transmitter transmits.

12. The method according to claim 11, wherein during the step of initially storing a basic version of the program in the memory at least one program parameter is stored which determines the time intervals between the measurement operations and/or between the transmitting operations dependent on the tire pressure and/or dependent on the rate of the tire pressure drop and/or dependent on the vehicle speed.

13. The method according to claim 1, wherein during the step of initially storing a basic version of the program in the memory a first program parameter identifier is stored, the first program parameter identifier individualizing a first tire pressure monitoring device, wherein the step of subsequently creating an appropriate full version for a selected vehicle type includes overwriting the first program parameter identifier with a second program parameter identifier individualizing a second tire pressure monitoring device, which in a unchanged wheel position of the vehicle is replaced with the first tire pressure monitoring device.

14. The method according to claim 1, wherein the transmitted selected vehicle type program parameters are secured against change.

15. The method according to claim 1, the tire pressure monitoring device comprising a secondary measurement device or multiple secondary measurement devices for measuring measurement quantities other than the tire pressure.

16. The method according to claim 15, wherein the electrical circuit is configured for processing measurement values supplied by the secondary measurement device or devices.

17. A tire pressure monitoring system, comprising:
at least one tire pressure monitoring device equipped to attach to a wheel of a vehicle provided with pneumatic tires, the tire pressure monitoring device comprising:
a first device configured for measuring a tire pressure present in the pneumatic tire or for measuring a change of the tire pressure;

an electrical circuit, of which at least a part operates digitally, for controlling the tire pressure monitoring device;

a memory in which a program for the electrical circuit is stored;

an electric power source for power supply of the tire pressure monitoring device; and a first transmitter operating in a first frequency range configured to transmit data out of the tire pressure monitoring device to a first receiver located outside the tire pressure monitoring device;

wherein a basic version of the program is stored in the memory, the basic version of the program configured to be subsequently developed for multiple vehicle types; and a digitally operating transmission device, in which multiple addresses correspond to selectable vehicle types for which each have a corresponding set of the selected vehicle type program parameters, wherein the digitally operating transmission device is configured to transmit the set of selected vehicle type program parameters to the at least one tire pressure monitoring device and convert the basic version of the program with the set of transmitted selected vehicle type program parameters, thereby converting the basic version of the program into an appropriate full version for the selected vehicle type.

18. The tire pressure monitoring system according to claim 17, in which the multiple addresses corresponding to selectable vehicle types in the digitally operating transmission device are present in the form of a pull down menu.

19. The tire pressure monitoring system according to claim 17, including a second receiver provided within the at least one tire pressure monitoring device, the second receiver equipped to receive data from a second transmitter located outside the at least one tire pressure monitoring device and operating in a second frequency range, wherein the digitally operating transmission device comprises the second transmitter transmitting in the second frequency range.

20. The tire pressure monitoring system according to claim 19, wherein the digitally operating transmission device comprises a mobile telephone or a Smartphone.

21. The tire pressure monitoring system according to claim 20, wherein the mobile telephone or Smartphone has an interface for outputting data, wherein the interface is connected to a module, the module comprising the second transmitter and a control circuit, the second transmitter operating in the second frequency range, and the control circuit configured to receive the selected vehicle type program parameters output via the interface and control the second transmitter so that it transmits the selected vehicle type program parameters to the second receiver in the at least one tire pressure monitoring device.

22. The tire pressure monitoring system according to claim 17, wherein the memory of the at least one tire pressure monitoring device comprises a first memory connected to a supplemental memory, wherein between the first memory and the supplemental memory there is a line connection via which communication between the first memory and the supplemental memory is possible, and wherein the basic version of the program is partly stored in the first memory and partly stored in the supplemental memory.

23. The tire pressure monitoring system according to claim 22, wherein the supplemental memory is an EPROM or an EEPROM.

24. The tire pressure monitoring system according to claim 22, wherein communication between the first memory and the supplemental memory comprises an encrypted manner communication.

25. The tire pressure monitoring system according to claim 17, the tire pressure monitoring device comprising a secondary measurement device or multiple secondary measurement devices for measuring measurement quantities other than the tire pressure.

26. The tire pressure monitoring system according to claim 25, wherein the electrical circuit is configured for processing measurement values supplied by the secondary measurement device or devices.

27. A tire pressure monitoring device equipped for attaching to a wheel of a vehicle provided with pneumatic tires, the tire pressure monitoring device comprising:
an integrated circuit comprising:
a pressure sensor configured to measure a tire pressure present in the pneumatic tires or a change of the tire pressure in the pneumatic tires;
a first memory connected to the pressure sensor;
a first transmitter connected to the integrated circuit, the first transmitter operating in a first frequency range configured to transmit data out of the tire pressure monitoring device to a first receiver located outside the tire pressure monitoring device;
an electric power source configured to supply energy to the integrated circuit and first transmitter;
a supplementary memory connected to the first memory by a line connection;
wherein a basic version of the program is partly stored in the first memory and partly stored in the supplemental memory, the basic version of the program configured to be subsequently developed for multiple vehicle types by overwriting a set of provisional program parameters with a set of transmitted selected vehicle type program parameters.

28. The tire pressure monitoring device according to claim 27, wherein the supplemental memory is an EPROM or an EEPROM.

29. The tire pressure monitoring device according to claim 27, including a second receiver connected to the integrating circuit, the second receiver equipped to receive data from a second transmitter which is located outside the tire pressure monitoring device and operates in a second frequency range, where the selected vehicle type program parameters are transmitted to the second receiver by means of radio signals in the second frequency range.

30. The tire pressure monitoring device according to claim 29, wherein the second transmitter comprises a digitally operating transmission device, in which multiple addresses correspond to selectable vehicle types for which each have a corresponding set of the selected vehicle type program parameters, wherein the digitally operating transmission device is configured to transmit the set of selected vehicle type program parameters to the second receiver and overwrite the set of provisional program parameters with the set of transmitted selected vehicle type program parameters, thereby converting the basic version of the program into an appropriate full version for the selected vehicle type.

31. The tire pressure monitoring device according to claim 30, wherein the transmitted selected vehicle type program parameters comprise equal to or less than 30 bytes of data.

32. The tire pressure monitoring device according to claim 27, wherein the integrated circuit comprises a control and evaluation circuit connected to the pressure sensor and the first memory.

* * * * *